(No Model.)
J. PETTINGER.
AXLE AND WHEEL.
No. 359,403. Patented Mar. 15, 1887.
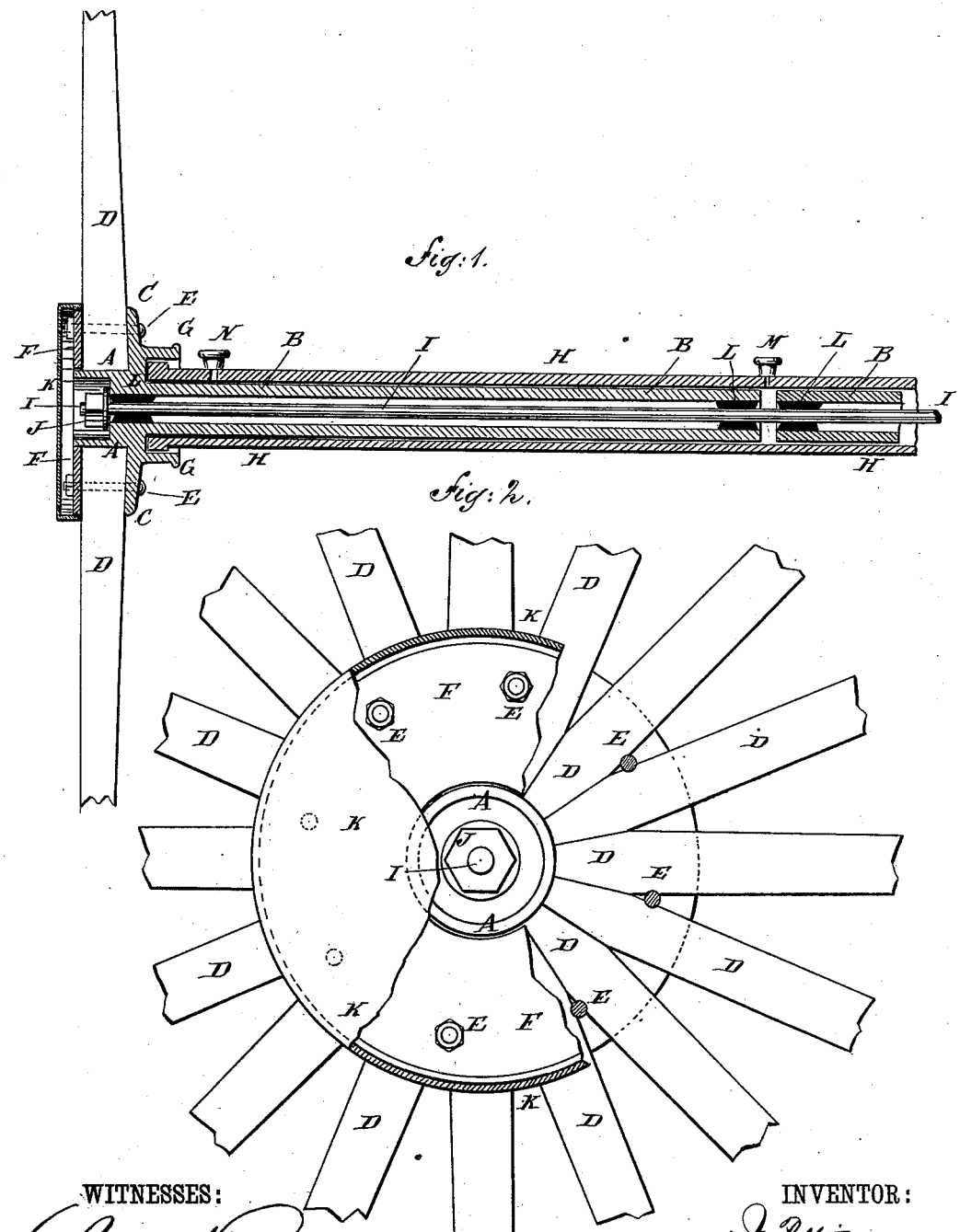

UNITED STATES PATENT OFFICE.

JOHN PETTINGER, OF CARPENTERIA, CALIFORNIA.

AXLE AND WHEEL.

SPECIFICATION forming part of Letters Patent No. 359,403, dated March 15, 1887.

Application filed June 13, 1884. Renewed August 9, 1886. Serial No. 210,447. (No model.)

*To all whom it may concern:*

Be it known that I, JOHN PETTINGER, of Carpenteria, in the county of Santa Barbara and State of California, have invented a new and useful Improvement in Wheels and Axles, of which the following is a full, clear, and exact description.

Reference is to be had to the accompanying drawings, forming a part of this specification, in which similar letters of reference indicate corresponding parts in both the figures.

Figure 1 is a sectional elevation of my improvement, taken longitudinally with the axle, parts being broken away. Fig. 2 is a side elevation, partly in section, of the middle part of the wheel.

The object of this invention is to promote simplicity in the construction and convenience and durability in the use of wheels and axles.

The invention consists in a wheel and axle constructed with a hub cast solid with a hollow spindle and an annular flange and a cup-flange. Upon the spindle is placed a hollow axle, which is secured in place by a binding-rod passing through the said spindle and hub. With the hub and its solid flange is connected by bolts an annular plate for clamping the spokes in place. The annular clamping-plate and its bolts and the ends of the hubs and binding-rods are covered and concealed by a cap screwed upon the edge of the said annular plate, as will be hereinafter fully described.

A represents the hub, which is cast solid with the outer end of the hollow spindle B. Upon the inner end of the hub A is formed an annular flange, C, against which the inner ends of the spokes D rest, and which is perforated to receive the fastening-bolts E. The adjacent sides of the ends of the spokes D are tapered to fit against each other, while their ends rest against the sides of the hub A, as shown in Figs. 1 and 2. F is an annular plate which fits upon the outer end of the hub A, and is perforated to receive the fastening-bolts E. A bolt, E, is used for each pair of spokes D, the adjacent sides of which are recessed to receive the said bolts, as shown in Fig. 2, so that the inner ends of the spokes will be held securely in place by the plate F and bolts E.

Upon the outer side of the flange C is formed a cup-flange, G, forming an annular recess between the said flange and the hollow spindle B to receive the end of the hollow axle H, placed upon the said spindle, and which is secured in place by the rod or long bolt I, passed through the two spindles B, and having nuts J, screwed upon their ends. The outer ends of the hubs A are countersunk to receive the nuts J, so that the ends of the binding-rods I and the outer sides of the nuts J may be flush with or a little below the surface of the outer end of the said hub A, as shown in Fig. 1. The outer end of the hub A, the outer ends of the bolts E, and the annular plate F are covered and concealed by the cap K, screwed upon the outer edge of the said plate F, as shown in Fig. 1. The rod I passes through rubber or other suitable packing, L, placed in the ends of the hollow spindle B, as shown in Fig. 1, to center the said rod and prevent noise when the vehicle is in use. The spindles B of the two wheels are made of such a length that their inner ends will nearly meet at the center of the axle H.

M is an oil-cup, from which a hole leads through the side of the hollow axle H at its center, so as to introduce oil into the space between the adjacent ends of the spindle B. To the axle H, near its ends, is secured another oil-cup, N, from which a hole leads through the side of the said axle H, so as to introduce oil into the space between the outer parts of the axle H and spindle B.

With this construction the rod I and the two spindles B will revolve together within the axle H, except when one of the said wheels moves faster than the other, in which case one of the said spindles will turn upon the said rod.

Another advantage of this construction is that the bearing-surfaces can be oiled without its being necessary to remove the wheels, and that the outer surface of the wheels and axle will not be liable to have oil upon it, to soil the clothes coming in contact with the said surface.

Having thus described my invention, I claim as new and desire to secure by Letters Patent—

1. In an axle and wheels, the hub A, cast solidly with a hollow spindle, and at its inner end with an annular flange, said flange having cast upon its inner side a tubular or cup flange, substantially as and for the purpose set forth.

2. In an axle and wheels, the hub A, cast solidly with a hollow spindle and with an annular flange at its inner end, said flange being cast with a tubular or cup flange upon its inner side, in combination with the hollow axle H and the binding-rod I, substantially as and for the purpose set forth.

3. In an axle and wheels, the hub A, having a hollow spindle and an annular flange, the annular plate F, bolts E, and the cap K, screwed upon the periphery of the plate F, substantially as and for the purpose set forth.

4. The combination, with a hollow axle, of hubs having hollow spindles cast integral therewith, and a bolt extending through the hollow spindles for securing the hubs upon the axle, substantially as shown and described.

5. The combination, with the hollow axle H, the spindles B of the hubs A, and the fastening-bolt J, of the packing L, substantially as shown and described, and for the purpose set forth.

JOHN PETTINGER.

Witnesses:
ROBERT STRATHEARN,
ETTA MARCY.